United States Patent
Bernas et al.

[15] 3,679,170
[45] July 25, 1972

[54] BALL VALVE WITH POSITIVE LOCKING MECHANISM

[72] Inventors: Richard J. Bernas, Midland; Clarence J. Kaczynski, Auburn, both of Mich.

[73] Assignee: The Dow Chemical Company, Midland, Mich.

[22] Filed: March 8, 1971

[21] Appl. No.: 121,756

[52] U.S. Cl............................251/104, 251/110, 251/297
[51] Int. Cl........................................................F16k 35/06
[58] Field of Search...................251/104, 110, 297, 315; 137/385, 553

[56] References Cited

UNITED STATES PATENTS 955,611    4/1910    Stevens..............................251/110 X Primary Examiner—Henry T. Klinksiek
Attorney—Griswold & Burdick, V. Dean Clausen and Lloyd S. Jowanovitz

[57] ABSTRACT

The lock mechanism described herein is adapted for installation on a conventional ball valve. Basically, the mechanism comprises a U-shaped member, with the lower leg of the member having a hole therein and an upstanding stud positioned next to the hole. The lower leg of the U-member fits over the valve stem housing below the valve handle and is slidable up and down on the stem housing. In this position, both the upper and lower legs of the U-member are generally horizontal to the valve body, and the upper leg lies above the valve stem, which fits in the housing. A coil spring on the valve stem housing below the lower leg exerts a continuous upward force against the lower leg. The lower leg is spaced a short distance below the handle by a washer positioned on the stem housing between the handle and the lower leg. When the valve is in a closed position, the upward force of the spring on the lower leg keeps the stud at a height such that it will engage an ear member on the handle and thus positively lock the valve in a closed position. The valve can be opened by pressing forward on the upper leg of the U-member, which disengages the stud from the lower leg and allows the handle to be rotated to open the valve.

4 Claims, 4 Drawing Figures

PATENTED JUL 25 1972 3,679,170

INVENTORS.
Richard J. Bernas
Clarence J. Kaczynski
BY
J. Dean Clausen
AGENT

BALL VALVE WITH POSITIVE LOCKING MECHANISM

BACKGROUND OF THE INVENTION

The present invention relates to ball valves and, more particularly, to a ball valve which incorporates a mechanism for positively locking the valve in the closed position.

In one type of a conventional ball valve, as illustrated in FIG. 1, a rotatable ball with a fluid conduit therein is positioned in the fluid conduit of the valve body. A slot on the upper side of the ball is adapted to receive the lower end of a rotatable stem which is carried in a housing mounted on the valve body. The upper end of the stem fits into the operating end of a handle, the operating end being defined by a flat portion having two diagonally opposed ear members thereon. When the valve is in open position the fluid conduit of the ball lines up with the valve body conduit. In the open position the handle lies parallel to the valve body and one of the ear members locks against one edge of an upstanding stop bracket, which is mounted on the valve body. The valve is closed by rotating the handle a quarter-turn backward so that the solid portion of the ball blocks the fluid conduit of the valve body. In the closed position of the valve the opposite ear member on the handle locks against the opposite edge of the bracket and the handle itself is perpendicular to the valve body.

Although ball valves are basically sound in construction and operation, the valves presently in use are somewhat unsatisfactory from a safety standpoint. For example, assume that the valve as shown in FIG. 1 is in closed position, i.e., the handle is perpendicular to the valve body. In the closed position it is relatively easy for an operator to unintentionally bump the handle from the front side, i.e., looking in the direction of arrow A. Since only a slight amount of force is required to push the handle around a quarter-turn to the open position, it is very easy to accidentally open the valve. In the handling of certain chemical fluids, as those skilled in the art will appreciate, the unintentional opening of a valve in a process line can be a very hazardous circumstance.

SUMMARY OF THE INVENTION

Accordingly, it is a broad object of the invention to provide a ball valve which includes means to prevent the valve from being opened accidentally.

A more specific object is to provide a ball valve which includes a mechanism for positively locking the valve in the closed position.

In general, the present lock mechanism comprises a U-shaped member, a spring means and a spacer means, which are adapted for installation on a conventional ball valve as described above. The U-member has upper and lower leg portions, with the lower leg including an upstanding stud member. In position on the valve, the lower leg is slidably carried on the stem housing and the upper leg lies above the valve stem, which fits in the housing. A continuous upward force is exerted against the lower leg by the spring means, which is carried on the stem housing below the lower leg. The valve handle, which is attached to the stem, is spaced from the lower leg by the spacer means, which is carried on the stem housing below the handle. Upon rotation of the handle to bring the valve to closed position, an ear member on the handle lockingly engages the stud member and holds the valve in locked position until it is released.

BRIEF DESCRIPTION OF THE DRAWING

As shown in FIG. 2, however, the valve includes the locking mechanism of this invention, with the valve being illustrated as it appears in the closed position.

DESCRIPTION OF A PREFERRED EMBODIMENT

Figures 1, 4:
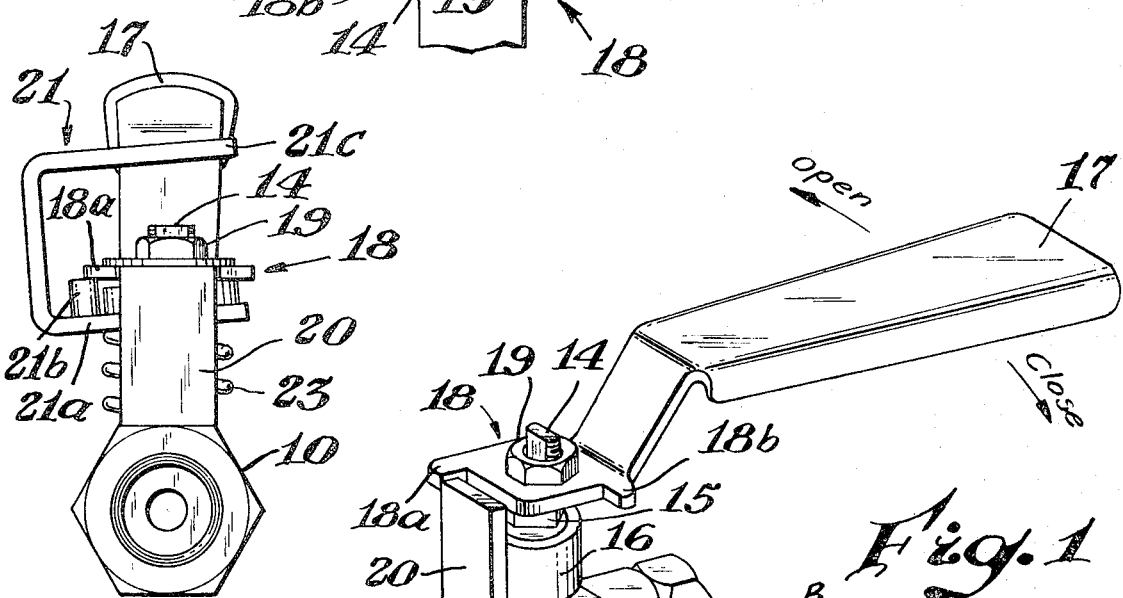
FIG. 1 is a perspective view, partly cut-away, illustrating a conventional ball valve, with the ball being shown in "open" position.
FIG. 4 is an end view, taken in the direction of arrow A in FIG. 1, showing the valve with locking mechanism as it appears when the valve is in "open" position.

Referring to the conventional ball valve as illustrated in FIG. 1, the valve comprises a valve body 10, which has a lengthwise fluid conduit 11 therein. Positioned in conduit 11 is a rotatable ball 12, which has a fluid conduit 13 therein. A slot on the upper side of ball 12 is adapted to receive the lower end of a stem 14. Stem 14 is rotatably carried in a packing nut 15, which fits down into a stem housing 16 mounted on the upper side of valve body 10.

A handle 17 provides means for rotating ball 12 in conduit 11 of valve body 10. The operating end of handle 17 is defined by a flat portion, indicated generally by numeral 18. The flat end 18 includes diagonally opposed ear members 18a and 18b. The handle end 18 fits over the upper part of stem 14 and is seated down against packing nut 15 by a lock nut 19. Mounted on the valve body 10 adjacent to stem housing 16 is an upstanding angle bracket 20, which acts as a stop member for the ear members 18a and 18b on handle 17.

Figure 2:
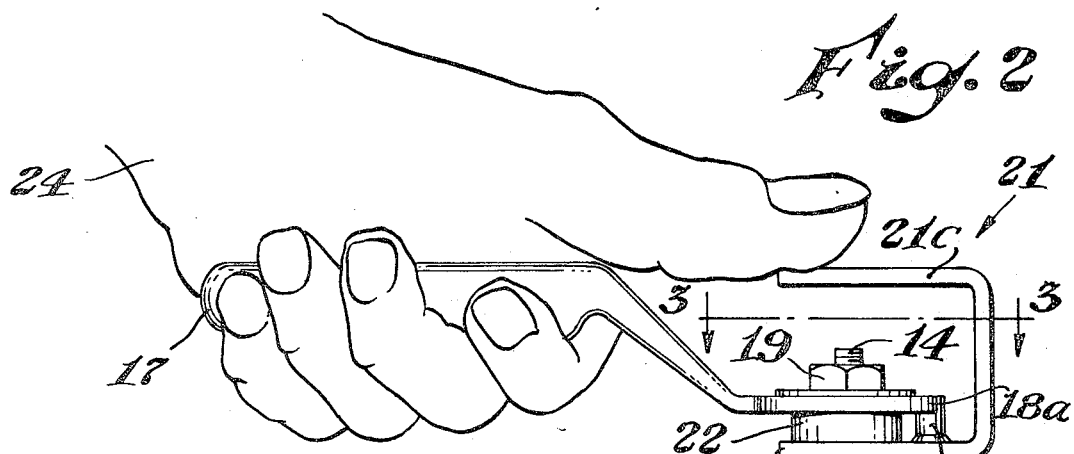
FIG. 2 is an end view of a conventional valve as shown in FIG. 1, with a view being taken in the direction of arrow B.
Figure 3:
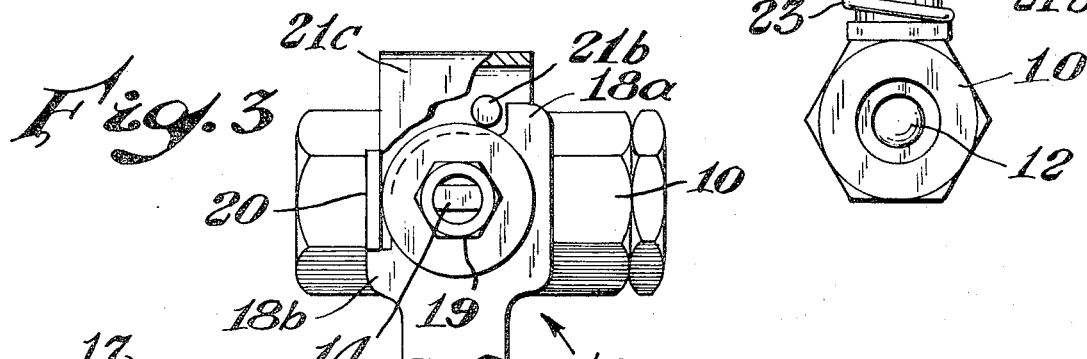
FIG. 3 is a top view of the valve with locking mechanism, the view being taken on line 3—3 of FIG. 2.

As explained above, the conventional ball valve described herein is somewhat unsatisfactory from the standpoint of safety in that it is relatively easy to unintentionally bump the handle 17 and thereby accidentally open the valve. The present invention, however, provides a mechanism which will positively lock the valve in the closed position, so that accidental opening of the valve will not occur. FIGS. 2, 3 and 4 illustrate the valve as shown in FIG. 1, but with the present lock mechanism installed on the valve.

Referring particularly to FIGS. 2 and 4, the lock mechanism comprises basically a U-shaped stop member, indicated generally by numeral 21. Member 21 is generally defined by a lower leg 21a, with an upstanding stud 21b positioned thereon, and an upper leg 21c. A hole in lower leg 21a (not shown) adjacent to stud 21b permits the lower leg to fit down over and to be slidably carried on the stem housing 16. In the normal position of member 21 above the valve body, therefore, the legs 21a and 21c are disposed generally horizontally to the valve body. The valve handle 17 is spaced from stop member 21 by a flat washer 22, which is positioned on stem housing 16 between the lower leg 21a and the flat end 18 of the handle.

In FIGS. 2 and 3 the valve is shown in the closed position, so that the ear 18a of handle 17 is locked against the stud 21b. With ear 18a being locked against stud 21b, therefore, handle 17 cannot be rotated backwards (counterclockwise) to open the valve, without disengaging the stud from the ear member. Also, when the valve is closed, the ear member 18b is locked against one edge of the stop bracket 20. The engagement of ear member 18b with stop bracket 20, therefore, prevents handle 17 from being rotated forward (clockwise), which would open the valve if the handle were rotated 90° beyond the closed position. The lower leg 21a of member 21 seats against a coil spring 23, which fits down over stem housing 16. Spring 23 exerts a continuous upward force against stop member 21, so that the stud 21b is at the proper height to engage ear member 18a when the valve is closed.

To open the valve, the operator grasps handle 17 with his hand 24 and presses forward against upper leg 21c of member 21 with his thumb. When member 21 is pushed forwardly, stud 21b disengages from ear member 18a, so that handle 17 can be rotated backwards (counterclockwise) to open the valve. When handle 17 is rotated backwards to open the valve, as shown in FIGS. 4, ear member 18a locks against one edge of the stop bracket 20. This prevents any further counterclockwise rotation of handle 17, which would close the valve if the handle were rotated 90° beyond the open position. At the same time that ear member 18a is locked against stop bracket 20, stud 21b is riding in its disengaged position. In the disengaged position, stud 21b is pushed down underneath the flat end 18 of handle 17, so that the upward force of spring 23 holds the stud tightly against the underside of the flat surface. The continuous upward force which is acting against stud 21b, therefore, provides a spring action which will permit the stud to snap into locking engagement with ear member 18a when handle 17 is rotated clockwise to close the valve.

What is claimed is:

1. In a ball valve having a positive locking mechanism thereon, the combination which includes:
   a. a valve body having a fluid conduit therein,
   b. a ball closure having a fluid conduit therein, the closure being positioned in the valve body conduit and adapted to rotate between an open position in which fluid can flow through the valve body and a closed position in which the ball closure will block fluid flow through the valve body,
   c. a stem having an upper and lower end, wherein the stem is rotatably carried in a stem housing mounted on the valve body and the lower end of the stem engages the ball closure,
   d. a valve handle having an operating end which engages the upper end of the valve stem and which includes a first ear member and a second ear member,
   e. a first stop member defining an upstanding bracket mounted on the valve body adjacent to the operating end of the handle and which is adapted to lockingly engage the first ear member upon rotation of the stem by the handle to bring the ball closure to the open position,
   f. a second stop member defining a generally U-shaped member having upper and lower leg portions which are positioned generally horizontally to the valve body, the lower leg being slidably carried on the stem housing and including an upstanding stud member, whereby upon rotation of the stem by the handle to bring the ball closure to closed position the first ear member is lockingly engaged by the upstanding stud member and the second ear member is lockingly engaged by the upstanding bracket, and
   g. a means which engages the second stop member and which applies a continuous upward force against said second stop member.

2. The valve of claim 1 in which the upward force means is defined by a coil spring which is carried on the stem housing and which engages the lower leg of the second stop member.

3. The valve of claim 1 which includes means for spacing the lower leg of the second stop member from the operating end of the valve handle.

4. The valve of claim 3 wherein the spacer means is defined by a flat washer carried on the stem housing and positioned between the operating end of the valve handle and the lower leg of the second stop member.

* * * * *